US011096380B2

(12) United States Patent
Horzesky et al.

(10) Patent No.: US 11,096,380 B2
(45) Date of Patent: Aug. 24, 2021

(54) METHOD FOR AQUACULTURE (71) Applicant: Ketcham Supply Co., Inc., New Bedford, MA (US)

(72) Inventors: Myron Horzesky, Acushnet, MA (US); Robert Ketcham, LeCanto, FL (US); Heather Ketcham, Newport, RI (US); Douglas G Sabin, Marblehead, MA (US)

(73) Assignee: Ketcham Supply Co., Inc., New Bedford, MA (US)

( * ) Notice: Subject to any disclaimer, the term of this patent is extended or adjusted under 35 U.S.C. 154(b) by 225 days.

(21) Appl. No.: 16/232,133

(22) Filed: Dec. 26, 2018

(65) Prior Publication Data

US 2019/0200582 A1   Jul. 4, 2019

Related U.S. Application Data

(60) Provisional application No. 62/611,307, filed on Dec. 28, 2017.

(51) Int. Cl.
*A01K 61/55* (2017.01)
*A01K 61/50* (2017.01)
*F16M 13/02* (2006.01)

(52) U.S. Cl.
CPC .............. *A01K 61/55* (2017.01); *A01K 61/50* (2017.01); *F16M 13/02* (2013.01)

(58) Field of Classification Search
CPC ........ A01K 61/54; A01K 61/55; A01K 61/60; A01K 61/50

(Continued)

(56) References Cited

U.S. PATENT DOCUMENTS 4,191,494 A * 3/1980 Nakamura .............. F16L 1/165
  137/116.5
4,434,743 A * 3/1984 Nickel ................... A01K 61/54
  119/239

(Continued)

FOREIGN PATENT DOCUMENTS

KR    200389768 Y1   7/2005
KR    200415091 Y1   4/2006

(Continued)

OTHER PUBLICATIONS

Office Action, dated Dec. 18, 2019, for corresponding Canadian Patent Application No. 3,028,688.

*Primary Examiner* — Magdalena Topolski
*Assistant Examiner* — Shada Mohamed Alghailani
(74) *Attorney, Agent, or Firm* — Build IP, LLC; Robert V. Donahoe (57) ABSTRACT

A method for aquaculture including a fastener that allows for a float to be easily detached from and securely reattached to an aquaculture cage. The method provides multiple toolless approaches to submerse an aquaculture cage that is buoyant in water when attached with a fastener to a hollow float defining a volume filled with air. The method includes in a first approach, detaching the hollow float from the aquaculture cage by releasing the fastener without using a tool to allow the cage to sink in the water and in a second approach, with the hollow float attached to the aquaculture cage, at least partially filling the float with fluid to fully submerse both the cage and the hollow float beneath a surface of the water.

18 Claims, 8 Drawing Sheets (58) Field of Classification Search
USPC .......................................... 119/234, 238, 239
See application file for complete search history.

(56) References Cited

U.S. PATENT DOCUMENTS

| | | | | |
|---|---|---|---|---|
| 4,465,399 A * | 8/1984 | Kikuzawa | ............... | E02B 3/046 405/32 |
| 4,704,990 A * | 11/1987 | Moxham | ................ | A01K 61/54 119/239 |
| 5,009,189 A * | 4/1991 | Neff | ........................ | A01K 31/08 119/200 |
| 5,133,149 A * | 7/1992 | Smyly, Sr. | ............. | A01K 69/06 43/100 |
| 5,329,719 A | 7/1994 | Holyoak | | |
| 5,477,813 A * | 12/1995 | Lien | ........................ | A01K 61/60 119/223 |
| 5,943,814 A | 8/1999 | Bartlett, Jr. | | |
| 6,386,146 B1 * | 5/2002 | Knott, Sr. | ............... | A01K 61/60 119/223 |
| 6,561,471 B1 * | 5/2003 | Hawie | .................... | A01K 97/10 211/60.1 |
| 6,611,965 B1 * | 9/2003 | Lee | ........................ | A61F 9/027 2/431 |
| 7,520,086 B2 * | 4/2009 | Melhorn | ................ | A01K 91/06 43/42.06 |
| 8,033,250 B2 | 10/2011 | Calinski | | |
| 9,339,016 B1 | 5/2016 | Donovan et al. | | |
| 2004/0025231 A1 * | 2/2004 | Ide | ........................... | A42B 3/20 2/425 |
| 2006/0162667 A1 * | 7/2006 | Papadoyianis | ......... | A01K 61/60 119/223 |
| 2006/0201434 A1 * | 9/2006 | Kujawa | .................... | A01K 7/00 119/61.5 |
| 2007/0131823 A1 * | 6/2007 | Mominee | ............. | F16L 3/1016 248/62 |
| 2008/0257275 A1 * | 10/2008 | Labra Reynolds | .... | A01K 61/54 119/213 |
| 2009/0255476 A1 * | 10/2009 | Colvin | ................... | A01K 39/02 119/74 |
| 2010/0018471 A1 | 1/2010 | Murdza | | |
| 2011/0048331 A1 * | 3/2011 | Vidal Rudloff | ........ | A01K 61/60 119/226 |
| 2011/0220032 A1 * | 9/2011 | Pendergrast | ........... | A01K 61/54 119/201 |
| 2011/0265729 A1 * | 11/2011 | Atz | ........................ | A01K 61/60 119/226 |
| 2012/0258622 A1 * | 10/2012 | Oh | ..................... | H01R 13/6592 439/585 |
| 2013/0186345 A1 * | 7/2013 | Leslie | .................... | A01K 61/60 119/240 |
| 2013/0277381 A1 * | 10/2013 | Franzone, Jr. | ............ | F16B 1/00 220/754 |
| 2013/0284104 A1 * | 10/2013 | Lindgren | ............... | A01K 61/60 119/223 |
| 2017/0027136 A1 * | 2/2017 | Newell | ................... | A01K 61/54 |
| 2017/0106947 A1 * | 4/2017 | Lee | ........................ | A01K 61/10 |
| 2017/0172122 A1 * | 6/2017 | Nguyen | ................. | A01K 69/08 |
| 2017/0215390 A1 * | 8/2017 | Jack | ........................ | A01K 61/54 |
| 2017/0245479 A1 | 8/2017 | DePaola et al. | | |
| 2018/0201347 A1 * | 7/2018 | Quinta Cortinas | ....... | B63B 3/04 |
| 2018/0213752 A1 * | 8/2018 | Goudey | ................. | A01K 61/55 |
| 2018/0288980 A1 * | 10/2018 | Boyle | .................... | A01K 61/65 |
| 2019/0200581 A1 * | 7/2019 | Matthews, III | ........ | A01K 69/06 |
| 2020/0120905 A1 * | 4/2020 | Menard | .................. | B63B 43/06 |
| 2020/0281170 A1 * | 9/2020 | Marissal | ................ | A01K 61/55 |

FOREIGN PATENT DOCUMENTS

| | | |
|---|---|---|
| KR | 200435836 Y1 | 2/2007 |
| KR | 20140078041 A | 6/2014 |
| KR | 20140137512 A | 12/2014 |
| WO | 89/00004 A1 | 1/1989 |
| WO | WO2017096424 A1 | 6/2017 |

* cited by examiner

METHOD FOR AQUACULTURE

RELATED APPLICATIONS

The application claims the benefit under 35 U.S.C. § 119(e) to U.S. Provisional Application Ser. No. 62/611,307, entitled "APPARATUS, SYSTEM AND METHOD FOR AQUACULTURE," filed on Dec. 28, 2017. The disclosure of the preceding application is herein incorporated by reference in its entirety.

BACKGROUND OF INVENTION

1. Field of Invention

This invention relates generally to apparatus, systems and methods for aquaculture. More specifically, at least one embodiment relates to apparatus, systems and methods that include a fastener that allows for a float to be easily detached from and securely reattached to an aquaculture cage.

2. Discussion of Related Art

Oyster farming and other forms of aquaculture have become increasingly important for global food production. Oysters are often grown in cages where immature oysters, referred to as spats, are placed. The spats develop into mature oysters over time with the cages placed in the ocean, the oysters' natural environment. The cages protect the oysters from predators and allow a more straightforward harvest of oysters when they mature. Growth rates and yields are increased when the cages are periodically exposed to sunlight to disinfect them by removing aquatic growth on the cages and the oysters' shells.

Conventional approaches attach floats to a top side of the cage to provide buoyancy such that the cage is submerged just beneath the surface of the ocean. In this orientation, the cage is located at the top of the water column. Here the oysters are in an environment that has the greatest supply of food (i.e., plankton) and oxygen. With the cage in this orientation, the floats are exposed to the environment above the surface. Periodically, the cage is flipped over to place the floats beneath the cage in the water. In this orientation, the cage is exposed to the environment above the ocean's surface for a temporary period to allow the cage including the oysters to be exposed to sunlight. Exposure to sunlight dries out and kills unwanted organisms and aquatic growth that may have developed since the last time the cage was located above the ocean's surface. During the winter months or in advance of a storm the oyster cage is often lowered to the bottom of the ocean to protect the cage and/or the oysters from damage.

Hollow floats are widely used with oyster cages today. Typically, the float includes an opening with a watertight seal, for example, a threaded cap. The entire cage/float assembly is sunk to the ocean floor by opening the seal and allowing the hollow float to fill with water. The cage/float assembly is retrieved and the floats are emptied when the weather and/or season again permit the cage to be located near the surface without risk of damage. However, the water filled floats add considerable weight to the assembly such that they are difficult to handle and raise from the ocean floor.

Typically, the floats are affixed to the cage with some form of pallet strap or a single strand of wire, for example, aluminum wire or vinyl coated steel wire. Aluminum bands are often employed to secure the wire to the cage, however, power tools are required to compress and bend the aluminum band to secure the wire to the cage. Each of these approaches creates a permanent attachment that requires a knife, a band cutter, a wire cutter or some other tool to destroy the wire or band to detach the float from the cage. The preceding eliminates the option of employing the cage without an attached float unless the user is willing to destroy the means of attachment between the two. To reattach the float to the cage, a new wire or band must be reinstalled. This process is time consuming and inconvenient, in particular, when performed in the field.

Figure 1:
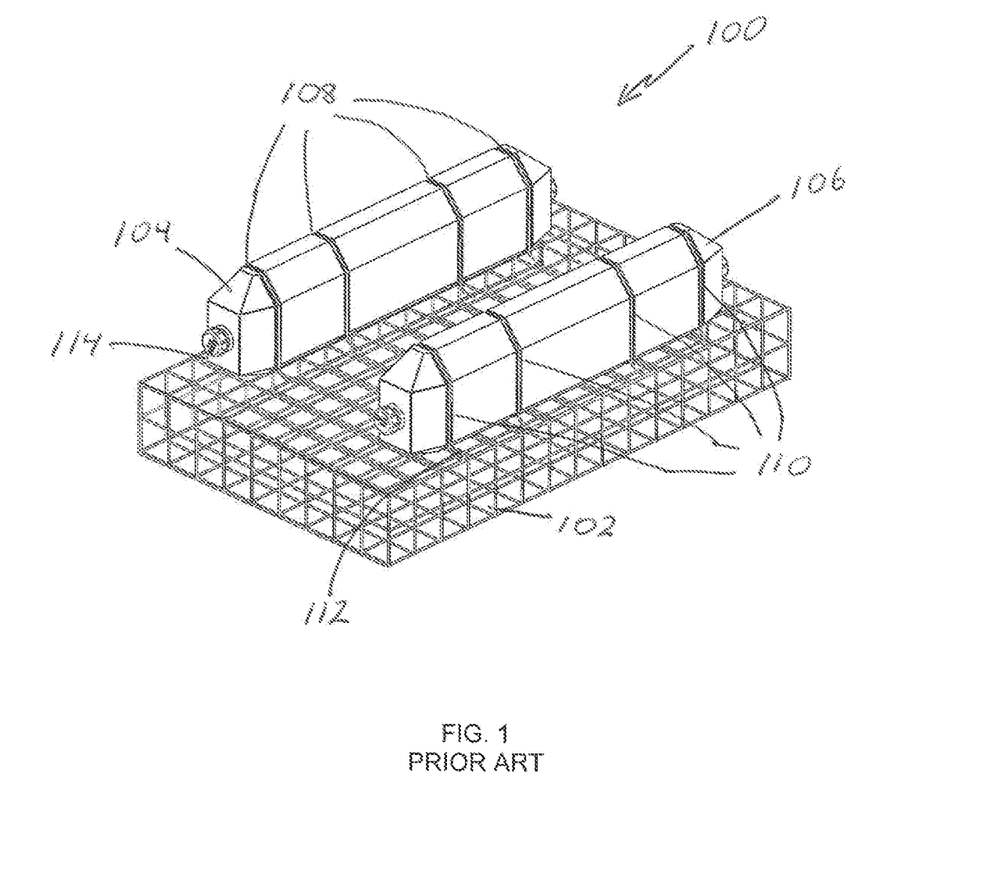
FIG. 1 illustrates an aquaculture cage according to the prior art.

FIG. 1 illustrates an aquaculture system 100 using one such known approach. The aquaculture system 100 includes a cage 102, a first float 104, a second float 106, a first set of bands 108 and a second set of bands 110. The first set of bands 108 is employed to secure the first float 104 to the cage 102. The second set of bands 110 is employed to secure the second float 106 to the cage 102. To secure the first float 104 to the cage 102, a user must weave each band included in the set of bands into an interior of the cage 102, back outside the cage 102 and around the first float 104. The two loose ends of a band are aligned with one another, secured together, the band is tightened and any loose ends cutaway. A similar approach must be employed to secure the second float 106 to the cage 102. The sets of bands 108, 110 must be cut and destroyed if the floats 104, 106 must be removed from the cage for any reason. Further, current approaches do a poor job of providing the most advantageous float layout for stability of the cages that are floating at sea.

FIG. 1 illustrates a first gap 112 and a second gap 114. The first gap 112 is a distance that separates an edge of the cage 102 from the outer edge of the second float 106. The second gap 114 is a distance that separates an edge of the cage 102 from the outer edge of the first float 104. The stability of the cage when floating at sea is reduced because neither float 104, 106 is located the maximum distance available from the longitudinal axis of the cage 102. In practice, this shortcoming can result in cages that tend to have their corners dip underwater in heavy seas. This can result in the cage being flipped over unintentionally and without the user's knowledge.

The prior float illustrated in FIG. 1 also demonstrates how the prior approaches fail to consider forces, (for example, shear forces) that act on the floats 104, 106 when they are attached to cages at sea. First, prior approaches tend to concentrate shear forces on the narrow region of the wire strap near the aluminum band. This places significant and cyclic stress on the bands that can lead to a premature failure as a result of metal fatigue. Second, the structure of the floats 104, 106 offers nothing to aid in the secure attachment of the floats to the cage 102. For example, there is no structure to help ensure that the floats do not slip lengthwise when gripped by the bands 108, 110. Instead, these prior approaches rely solely on the level of tightness achieved when the sets of bands 106, 108 are secured about the float.

To avoid suffocating oysters located in a cage, some separation between the bottom of the cage and the seabed is typically required when cages are located on the ocean floor. Otherwise the weight of the cage and contents may drive the oysters into the mud and/or sand. For cages that include floats, users try to sink the cage with the floats facing down. However, the natural buoyancy of the plastic and/or air pockets that may remain even after the float is filled with water make this approach unpredictable. As a result, the approach often results in the cage sinking to the ocean floor with the floats located above the cage. The preceding has prompted users to devise complicated approaches to try and push cages to the seabed. Separately or included in the preceding, divers may be hired to confirm whether cages are properly positioned on the seabed. Employing divers to perform these inspections is a costly and time consuming undertaking.

Cages designed for use on the ocean floor (referred to as a "bottom cage") are sometimes employed. Here, floatation is not required; therefore, bottom cages do not include floats. Instead, the cage includes feet that settle onto the ocean floor while keeping the bottom of the cage raised above the seabed. However, there is no approach that combines a cage that includes floatation with any feet. Consequently, growers who employ cages that include floatation must address the orientation of their cages anytime cages are lowered to the ocean floor.

Further, floats may need to be replaced with the cage in service, for example, a float may be punctured or otherwise damaged. Today, the user must typically remove the contents of the cage and then bring the cage to shore for repair. As mentioned above, the straps that secure the float to the cage must be cutaway to detach the float. That time consuming process often results in damage to the coating on the wire material. These exposed points can quickly deteriorate with direct exposure to salt water when the cage is returned to service.

SUMMARY OF INVENTION

Therefore, there is a need for apparatus, systems and methods that improve the functionality of aquaculture equipment by allowing for a toolless separation of floats from aquaculture cages. These approaches provide a high strength, corrosion resistant attachment of the floats to the cages. The attachment is easily released to separate the floats from the cage to allow the cage to sink to the ocean floor under its own weight. These approaches allow floats to be detached more quickly and cages sunk in advance of inclement weather or for any other reason. The floats are reattached to the cages just as quickly (and using the same hardware) when the cage is retrieved from the ocean floor. Further, some embodiments provide users with multiple approaches to sink the cage. For example where a hollow float is used, embodiments allow users to continue to employ the traditional approach of filling the attached floats with water plus an added option in which buoyant floats are detached from the cage and the cage sinks under its own weight. When the cages are sunk using only the weight of the cage they are easier to retrieve because the user is not hauling up the weight added by the water filled floats.

Prior approaches failed to consider that any advantage might be achieved by detaching a hollow float because it appeared unnecessary when using floats that can be filled with fluid to sink the entire assembly. However, embodiments described herein employ reusable fasteners to provide more complete functionality that is suited for use in a much wider variety of circumstances.

For example, where the user must respond to quickly get cages to the ocean floor in advance of a hurricane or flash freeze, embodiments allow a float to be removed in less than a minute. A substantial reduction in time when compared with the 5-10 minutes required to fill two hollow floats with enough sea water to sink a cage. These time-savings become huge when scaled to a situation where a farm includes several hundred floating cages. Further, cages that are sunk without the water filled floats are much easier to reorient should they be positioned wrong-side up when they land on the bottom.

An otherwise conventional bottom cage can also be equipped with toolless fasteners as described herein for attaching floats. According to this embodiment, the cage can be periodically raised to the surface for a temporary attachment of floats. The cage is then temporarily kept at the surface with the floats maintaining the cage above the surface to burn off any fouling. The floats are then removed without the use of tools and the cage returned to the sea floor. The floats can then be reused with another bottom cage including the toolless fasteners.

According to a first aspect, a fastener is configured to secure a float having an outer surface to an aquaculture cage. In some embodiments, the fastener includes a steel wire core welded into a grid and hot dipped galvanized, an adhesive layer applied to the hot dipped galvanized steel wire core and a vinyl outer coating adhered to the hot dipped galvanized steel wire core by the adhesive layer to provide a grid of multi-layer corrosion resistant material including multiple cells each cell including an opening defined by the multi-layer corrosion resistant material. According to one embodiment, the grid of multi-layer corrosion resistant material includes a proximate end including at least a first cell included in the multiple cells where the grid of multi-layer corrosion resistant material includes a distal end including at least a second cell included in the multiple cells. In further embodiments, the grid of multi-layer corrosion resistant material is sized and shaped to secure around at least a portion of the outer surface to secure the float to the aquaculture cage. The first cell is sized and shaped such that at least one edge of the first cell can be hingedly attached to the aquaculture cage and the second cell is configured to receive a latch to allow the distal end to be secured to the aquaculture cage and released therefrom without the use of tools. The fastener is configured to pivotally operate between a closed position in which the float is secured to the aquaculture cage by the fastener and an open position in which the float can be removed from an attachment to the aquaculture cage without the use of tools.

According to a second aspect, an aquaculture system for raising shellfish in a body of water includes a cage having an interior and a door configured to open and close to allow the shellfish to be located in and later removed from the interior, a float configured to secure to the cage, a first fastener and a second fastener each configured to releasably attach the float to the cage. According to some embodiments, the float includes a liquid-tight outer wall shaped and configured to provide a first surface and a second surface where the outer wall forms a hollow interior. Further, the float includes at least one opening configured to permit fluid to be added to the hollow interior, the float operable in a first state in which the float provides buoyancy sufficient to maintain the float at substantially a surface of the body of water with the float secured to the cage and a second state in which the float is filled with a sufficient volume of fluid such that the float and the cage sink beneath the surface of the body of water with the float secured to the cage. In a still further embodiment, each of the first fastener and the second fastener including a proximate end, a distal region and a central region located between and connecting the proximate end to the distal region, respectively, the respective proximate ends hingedly attached to the cage, the respective distal regions configured to releasably attach to the cage, the respective central regions shaped and configured to engage the second surface with the float secured to the cage by the first fastener and the second fastener.

According to a third aspect, a method provides multiple toolless approaches to submerse an aquaculture cage that is buoyant in water when attached with a fastener to a hollow float defining a volume filled with air. According to some embodiments, the method includes in a first approach, detaching the hollow float from the aquaculture cage by releasing the fastener without using a tool to allow the cage to sink in the water and in a second approach, with the hollow float attached to the aquaculture cage, at least partially filling the float with fluid to fully submerse both the cage and the hollow float beneath a surface of the water.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
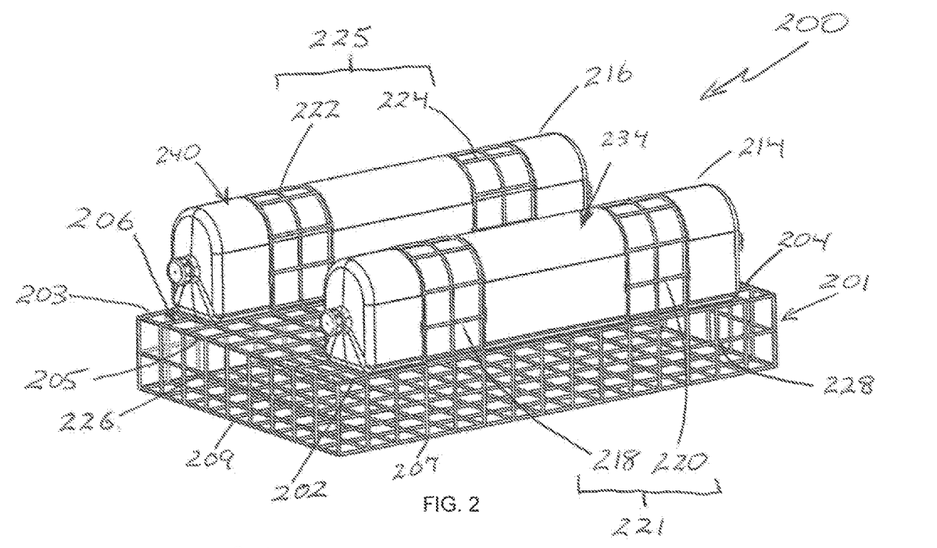
FIG. 2 illustrates a perspective view of an aquaculture system including floats and a cage in a first orientation in accordance with one embodiment.

Referring to FIG. 2, an aquaculture system 200 is illustrated in accordance with one embodiment. The aquaculture system 200 includes a cage 201, a first float 214, a second float 216, a first fastener 218, a second fastener 220, a third fastener 222 and a fourth fastener 224. The cage 201 is constructed of a wire mesh, for example, a corrosion resistant wire mesh. The aquaculture system 200 illustrated in FIG. 2 is oriented such that the floats 214, 216 are located above the cage 201. In general, the orientation illustrated in FIG. 2 is employed to locate the floats 214, 216 at the surface such that the cage 201 is submerged just below the surface of the water.

The cage 201 includes a first longitudinal edge 202 and a second longitudinal edge 203 parallel to the first longitudinal edge. The cage also includes a first transverse edge 204 and a second transverse edge 205 located at opposite ends of the cage from one another with the first transverse edge 204 and the second transverse edge 205 perpendicular to and connecting the first longitudinal edge 202 and the second longitudinal edge 203.

The first longitudinal edge 202, the second longitudinal edge 203, the first transverse edge 204 and the second transverse edge 205 define boundaries of a top panel 206 that provides a first surface to which the floats 214, 216 are secured by the fasteners 218, 220, 222, 224. According to the illustrated embodiment, the first fastener 218 and the second fastener 220 form a first pair of fasteners 221 employed to secure the first float 214 to the top panel 206. Further, the third fastener 222 and the fourth fastener 224 form a second pair of fasteners 225 employed to secure the second float 216 to the top panel 206. The first float 214 includes a first surface located on an underside of the first float 214 in the orientation illustrated in FIG. 2. Similarly, the second float 216 includes a first surface located on an underside of the second float 216 in the orientation illustrated in FIG. 2. The first float 214 includes a second surface 234 and the second float includes a second surface 240. Each of the second surface 234 and the second surface 240 extend a length of the first float 214 and the second float 216, respectively. Further, as described below, each of the second surface 34 and the second surface 240 include one or more recessed regions. The first fastener 218 and the second fastener 220 engage the second surface 234 to secure the first float to the cage 201. The third fastener 222 and the second fastener 224 engage the second surface 240 to secure the second float 216 to the cage.

In contrast to prior approaches, FIG. 2 illustrates a float placement that maximizes stability of the aquaculture system 200. For example, each of the floats 214, 216 is secured to the top panel 206 in a location that places the float radially outward from the longitudinal axis of the cage 201 as far as possible while maintaining full contact between the underside (or "first surface") of each float 214, 216 and the top panel 206. The result maximizes the spacing between floats 214, 216 and provides a more stable system because the floats have a wider spacing than found in prior systems. According to some embodiments, the floats 214, 216 are designed with an increased interior volume relative to prior designs. The preceding feature acts to increase the buoyancy of the float which further increases the stability of the aquaculture system 200.

As described in greater detail below, each fastener 218, 220, 222, 224 is movable from a closed position in which the floats 214, 216 are secured to the cage 201 and an open position in which the floats 214, 216 can be removed from the cage 201. In various embodiments, each of the fasteners 218, 220, 222, 224 is hingedly attached to the cage 201 such that the respective fastener can be pivoted between the open position and the closed position.

Figure 3:
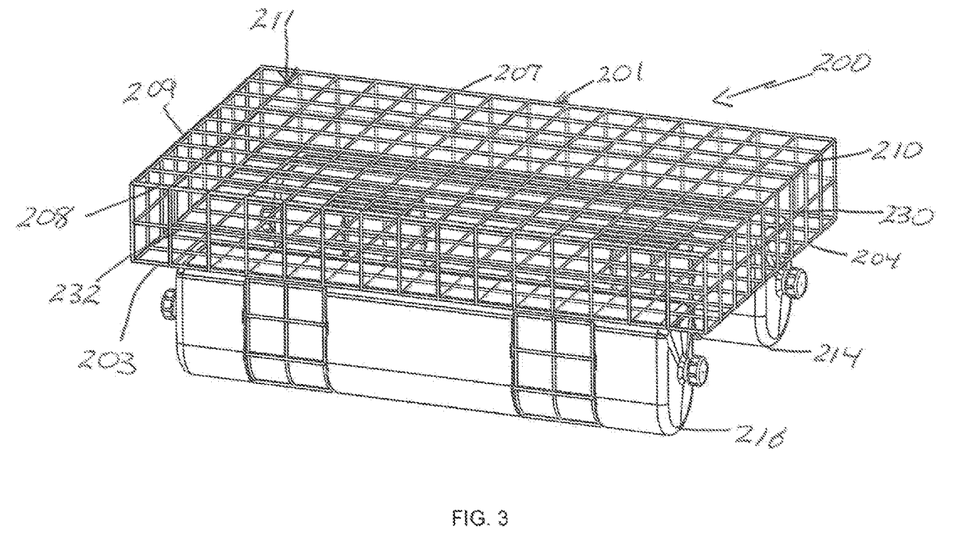
FIG. 3 illustrates a perspective view of the aquaculture system of FIG. 2 in a second orientation.

Referring now to FIG. 3, the aquaculture system 200 is illustrated in an orientation in which the system 200 is inverted relative to the orientation illustrated in FIG. 2. As illustrated in FIG. 3, the cage 201 is located above the floats 214, 216. In general, the orientation illustrated in FIG. 3 is employed to maintain the cage 201 above the surface of the water where it is exposed to the environment for drying/cleaning.

FIG. 3 illustrates a third longitudinal edge 207, a fourth longitudinal edge 208, a third transverse edge 209 and a fourth transverse edge 210. The third longitudinal edge 207, the fourth longitudinal edge 208, the third transverse edge 209 and the fourth transverse edge 210 define boundaries of a bottom panel 211 that provides a second surface of the cage 201. Referring to FIGS. 2 and 3, a first end panel 226 extends between the second transverse edge 205 and the third transverse edge 209, a first side panel extends between the first longitudinal edge 202 and the third longitudinal edge 207, a second end panel 230 extends between the first transverse edge 204 and the fourth transverse edge 210 and a second side panel 232 extends between the second longitudinal edge 203 and the fourth longitudinal edge 208.

According to the illustrated embodiment, the cage 201 is fabricated from a corrosion resistant wire mesh. Accordingly, in this embodiment, each of the top panel 206, the bottom panel 211, the first end panel 226, the first side panel 228, the second end panel 230 and the second side panel 232 is fabricated from corrosion resistant wire mesh. This structure provides the cage 201 with an overall interior region defined by the panels 206, 211, 226, 228, 230, 232. According to some embodiments, one or more of the panels 206, 211, 226, 228, 230, 232 is hingedly attached to the cage 201. The hinged panel is opened to provide access to the interior region. Further, in some embodiments, the interior region is divided by one or more shelves. According to one embodiment, the shelves are also fabricated from corrosion resistant wire mesh.

In some embodiments, the corrosion resistant material is manufactured with a steel wire core that is welded into a grid and then hot dipped galvanized. In one embodiment, the grid is galvanized by dipping the grid in zinc such that the wire including the welded connections is coated. An adhesive is applied to the hot dipped galvanized steel wire core and a vinyl coating is applied to the grid to which it is bonded by the adhesive. According to an alternate embodiment, the vinyl coating is bonded to the hot dipped galvanized steel wire core by a process that does not use an adhesive. In one embodiment, the wire is an 8 gauge wire. According to one embodiment, the grid is formed using wires separated by substantially 4.5 inches from adjacent wires. In this embodiment, the oysters are placed in an open mesh bag and the bags are located within the cage 201. According to another embodiment, a smaller gauge wire is used and the grid is sized in any of ½ inch, ¾ inch, 1 inch or 1.5 inch dimensions. In this embodiment, the small size of the openings allows oysters to be placed in the cage without the use of bags. Examples of suitable marine grade wire mesh include AQUAMESH by Riverdale Mills and SEAPLAEX by Cavatorta.

Figure 10:
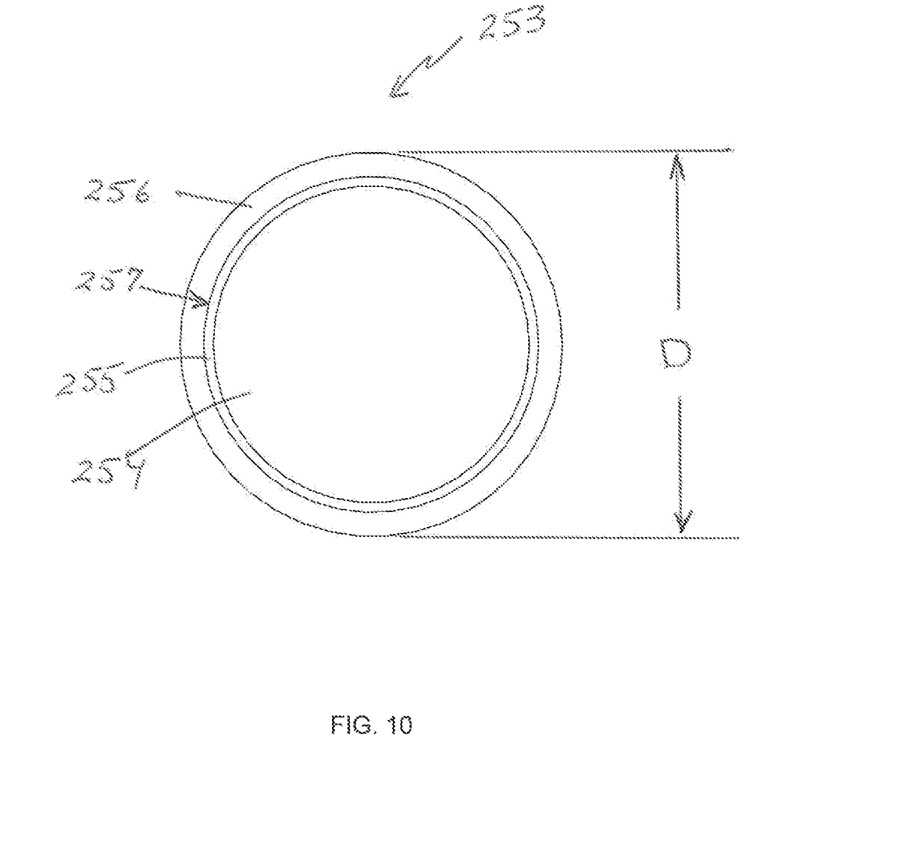
FIG. 10 illustrates a cross-sectional view of a corrosion resistant wire in accordance with one embodiment.

According to various embodiments, each of the fasteners 218, 220, 222, 224 is manufactured from a corrosion resistant material as described herein. Referring now to FIG. 10, a cross-sectional view of a corrosion resistant wire 253 is illustrated in accordance with one embodiment. The wire 253 includes a steel core 254, a layer of zinc galvanizing 255 and an insulating layer 256. The corrosion resistant wire 253 has an overall outside diameter D. In one version, the steel core 254 is a high tensile steel wire and the insulating layer is manufactured from PVC. FIG. 10 also illustrates an outer surface 257 of the layer of zinc galvanizing 255. In a further embodiment, a high tensile steel wire is zinc galvanized to provide the layer of zinc 255. A bonding agent is then applied to the outer surface 257 before the insulating layer of PVC is applied. According to one embodiment, each of the fasteners 218, 220, 222, 224 includes a multi-cell construction using the corrosion resistant wire 253 as described in the preceding embodiment.

Figure 4:
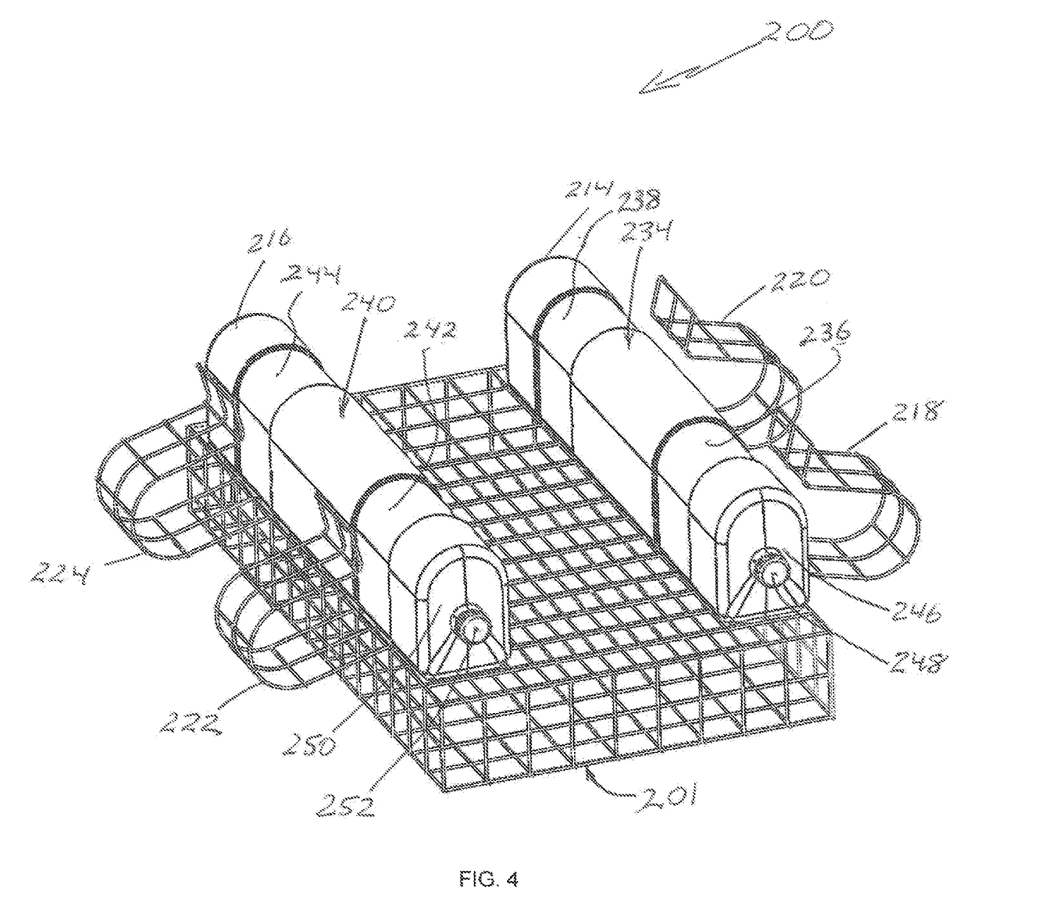
FIG. 4 illustrates a perspective view of the aquaculture system of FIG. 2 with fasteners in an open position in accordance with one embodiment.

Referring now to FIG. 4, the aquaculture system 200 is illustrated in an orientation in which the floats 214, 216 are located above the cage 201. FIG. 4 also illustrates the system 200 with each of the fasteners 218, 220, 222, 224 is in an open position. As illustrated, the floats 214, 216 can be separated from the cage 201.

Each of the first float 214 and the second float 216 provides a hollow plastic body that is generally longitudinal in shape (longer than it is wide) with an outer wall that provides a first surface that is located against the cage 201 when the float 214, 216 is secured to the cage 201. In the illustrated embodiment, the first surface is flat or substantially flat. The first surface is defined by a first longitudinal edge, a second longitudinal edge that is parallel to the first longitudinal edge, a first transverse edge that extends from the first longitudinal edge to the second longitudinal edge and a second transverse edge that extends between the two longitudinal ledges and is parallel to the first transverse edge. The first surface provides the bottom surface of the float 214, 216 with the aquaculture system 200 placed in the drying orientation illustrated in FIG. 4. In addition, the outer wall of each float 214, 216 includes a first sidewall and a second sidewall that, in the illustrated embodiment, extend perpendicular to the first longitudinal edge and the second longitudinal edge and are parallel to one another, respectively. The outer wall of each float 214, 216 also includes a second surface that extends between the first side wall to the second side wall the length of the float 214, 216. According to the illustrated embodiment, each float 214, 216 also includes two opposing end walls that each includes an opening into an interior of the float. In accordance to some embodiments, the floats 214, 216 are manufactured using an extrusion blow molding processing. Applicant finds that the extrusion blow molding process efficiently produces hollow parts of nearly uniform wall thickness that are durable enough for use as flotation elements in aquaculture.

Figure 8:
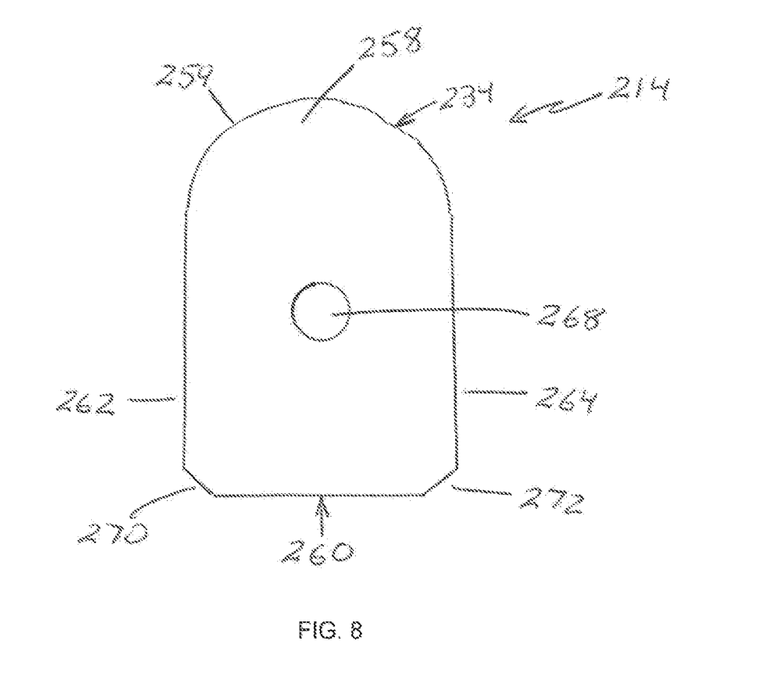
FIG. 8 illustrates an end view of a float included in the aquaculture system of FIG. 2 in accordance with one embodiment.

Referring now to FIG. 8, the structure identified in the preceding paragraph is illustrated with reference to the first float 214. As will be apparent to one of ordinary skill in the art in view of the disclosure herein, the second float 216 includes like structure. As illustrated in FIG. 8, the first float 214 includes a plastic body 258 having an outer wall 259 that defines the second surface 234, a first surface 260, a first side wall 262, a second side wall 264, an opening 268, a first longitudinal edge 270 and a second longitudinal edge 272. The first surface 260 is defined, in part, by the first longitudinal edge 270 and the second longitudinal edge 272. In the orientation illustrated in FIG. 8, the first surface 260 is a bottom surface which is substantially flat in shape. The first surface is shaped to allow it to fit against the top panel 206 of the cage 201. The first side wall 262 and the second side wall 264 extend upward from the first longitudinal edge 270 and the second longitudinal edge 272, respectively. According to the illustrated embodiment, the first side wall 262 and the second side wall 264 extend substantially perpendicular from the edges 270, 272. However, other configurations can be employed depending on the embodiment provide that the overall shape of the float 214 provides a stable floating structure. Thus, for example, the first side wall 262 and the second side wall 264 can slope inward toward one another to provide the float with a more V-like overall structure in accordance with another embodiment.

The second surface 234 extends the length of the float 214 from the first side wall 262 to the second side wall 264. According to the illustrated embodiment, the second surface 234 has a generally arcuate shape to provide more stable floatation when the cage 201 is flipped into the drying position in which the cage is located above the surface of the ocean. In this orientation, the second surface 234 is the bottom most portion of the aquaculture system 200. As described in more detail herein, the second surface 234 is engaged by the fasteners 218, 220 to secure the float 214 to the cage 201.

According to the illustrated embodiment, the opening 268 provides access to an interior of the body 258. For example, the opening 268 provides access to allow all or a portion of the interior to be filled with fluid. The float 214 loses much of its buoyancy when filled with fluid and allows an attached cage 201 to sink with the float attached to the cage. The opening 268 can be provided with a fluid tight seal that is employed to keep an air filled float 214 from accidentally taking in water and losing buoyancy. According to one embodiment, the opening 268 is surrounded by a threaded region that allows the opening to be sealed by securing a cap over the opening 268. According to an alternate embodiment, an opening is not provided and the interior is inaccessible. According to these embodiments, the cage 201 can quickly and easily be sunk by releasing the fasteners 218, 220 and removing the float 214 from the cage 201.

Referring again to FIG. 4, the second surface 234 of the first float 214 includes a first recessed region 236, a second recessed region 238, an end wall 246 and a cap 248. The second float 216 includes a first recessed region 242, a second recessed region 244, an end wall 250 and a cap 252. According to the illustrated embodiment, the recessed regions 236, 238, 242, 244 are formed during the manufacturing process. The regions 236, 238, 242, 244 each include a depth sufficient to receive the corresponding fastener 218, 220, 242, 244, respectively, and assist in securing the floats 214, 216 in a fixed position relative to the cage 201. For example, with the float 214 secured to the cage 201 as illustrated in FIGS. 2 and 3, the float 214 is substantially prevented from moving in a direction parallel to the longitudinal axis of the float 214 because walls at either end of the first recessed region 236 engage the first fastener 218 and the walls at either end of the second recessed region 238 engage the second fastener 220 with the float secured to the cage 201. Lateral movement of the second float 216 relative to the cage 201 is also prevented in a similar fashion because walls at either end of the first recessed region 242 engage the third fastener 222 and the walls at either end of the second recessed region 244 engage the fourth fastener 224 with the float secured to the cage 201.

The opening 268 located in the end wall 246 of the first float 214 is illustrated and described with reference to FIG. 8. FIG. 4 illustrates an embodiment in which the first float 214 includes the cap 248 which is attached to the float 214 in a manner that provides a fluid tight seal over the opening 268. According to some embodiments, each of the floats 214, 216 include a threaded opening and an associated threaded cap at each end of the floats 214, 216, respectively. As illustrated in FIG. 4, the second float 216 includes the cap 252 to seal an opening (not illustrated) located in the end wall 250. According to one or more embodiments, the fluid-tight functionality of the threaded attachment of a cap to seal the opening is improved with the use of a gasket, for example, with an O-ring located in the cap.

Figure 5:
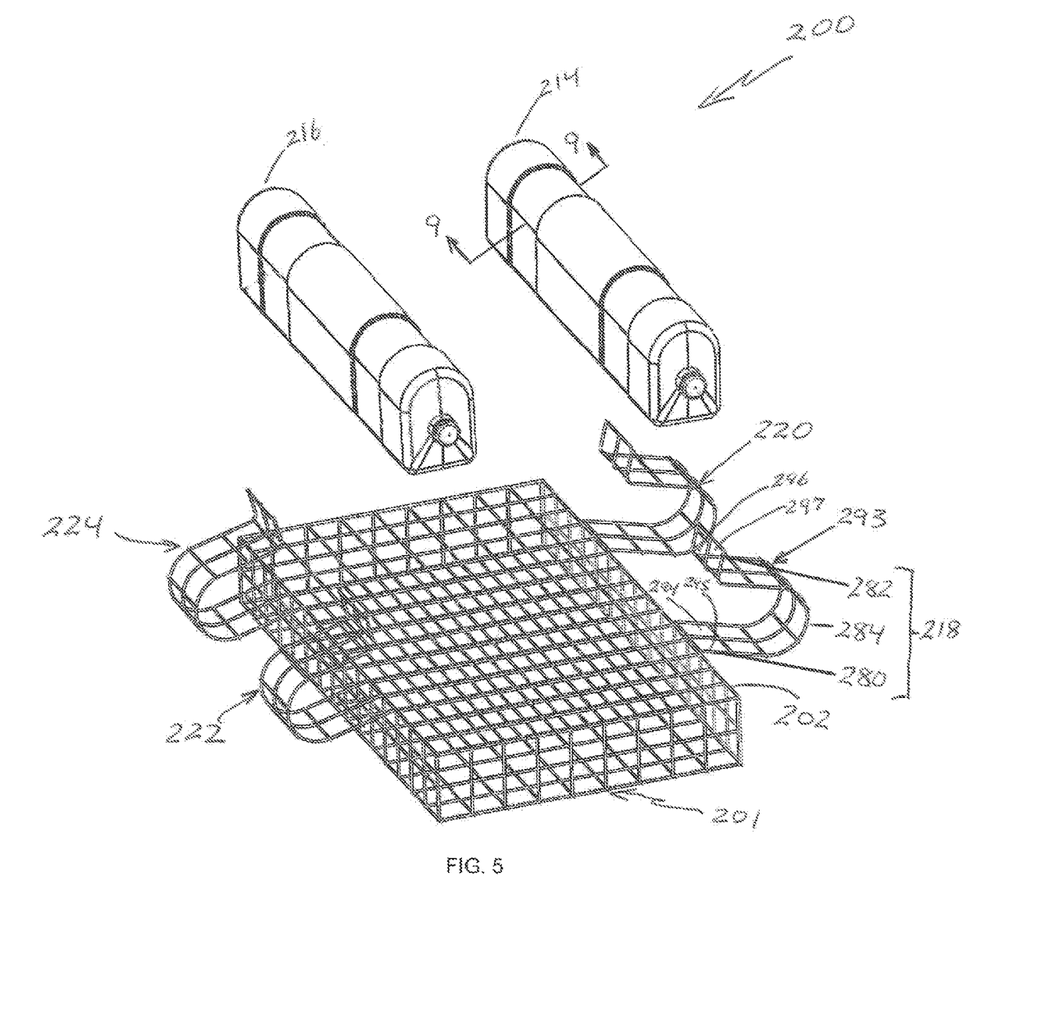
FIG. 5 illustrates a perspective view of the aquaculture system of FIG. 2 with fasteners in the open position and the floats separated from the cage in accordance with one embodiment.

Referring now to FIG. 5, the aquaculture system 200 is illustrated with the fasteners 218, 220, 222, 224 in the open position and the floats 214, 216 removed from the cage 201. For clarity the detailed structure and operation concerning the fasteners 218, 220, 222, 224 is described with reference to the first fastener 218. However, it will be apparent to one of ordinary skill in the art in view of the disclosure herein that each of the second fastener 220, the third fastener 222, and the fourth fastener 224 include a like structure and operation. The first fastener 218 includes a proximate end 280, a distal end 282 and a central region 284 that connects the proximate end 280 to the distal end 282. The proximate end 280 is hingedly attached to the first longitudinal edge 202. In the illustrated embodiment, the distal end 282 is formed in the shape of a flange to allow the distal end to be placed flat against the top panel 206 to secure the first fastener 218 to the panel 206. In various embodiments, the central region 284 includes a shape that allows the first fastener 218 to closely conform to a shape of the second surface of the float 214, 216. Accordingly, in the illustrated embodiment, the fasteners 218, 220, 222, 224 each include at least a portion of their respective central region that is arcuate in shape.

According to the illustrated embodiment, the first fastener 218 includes a grid 293 of cells where each cell includes an opening defined by the surrounding wire mesh. According to one embodiment, the grid 293 includes multiple cells. Further, in some embodiments, each of the proximate end 280 and the distal end 282 of the first fastener 218 include multiple cells. In the illustrated embodiment, the proximate end 280 includes a first cell 294 and a second cell 295. The distal end 282 includes a first cell 296 and a second cell 297.

A wire strap that is fixed to the cage acts as a cantilever beam concentrating moments, bending and stress where it attaches to the cage. Consequently, according to some embodiments, each fastener 218, 220, 222, 224 is constructed to be at least two cells wide and two cells in length. A multi-cell fastener is supported at each cell by a cross wire that prevents moments, bending and stresses from concentrating at the attachment point. Displacement, strain and stress are more evenly distributed across the length of the fastener when shear loads are applied to the float.

Figure 9:
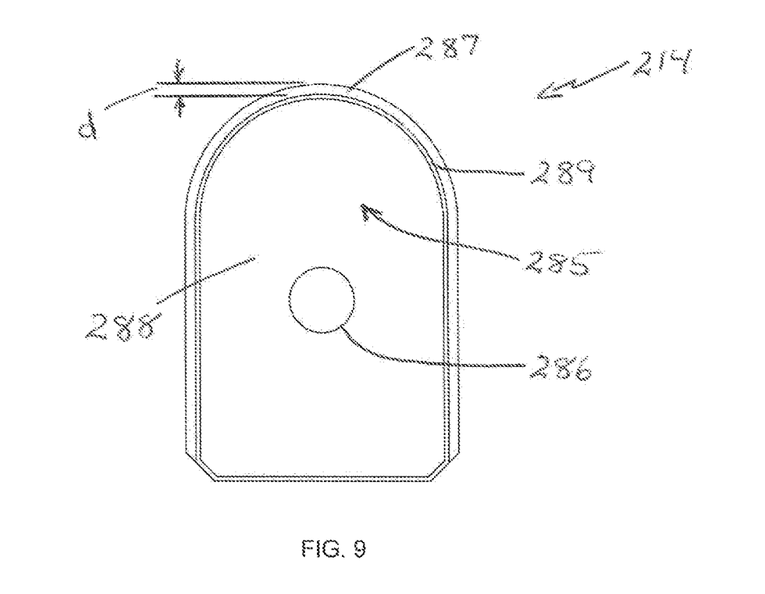
FIG. 9 illustrates a cross-sectional view of a float in accordance with one embodiment.

According to the illustrated embodiment, the recessed region 236, 238, 242, 244, respectively, are formed to receive a corresponding one of the fasteners 218, 220, 222, 224 when the fastener is placed about a float in the closed position. Referring now to FIG. 9, a cross-sectional view of the first float 214 is illustrated in the vicinity of the second recessed region 238. The recessed regions 236, 242, 244 are provided with like features. FIG. 9 illustrates an interior side of a second end wall 285, a second opening 286 and a hollow interior 288 of the first float 214. FIG. 9 also illustrates a plan view of an end wall 287 provided by the second recessed region 238 and an outer wall 289 that defines the hollow interior 288. According to the illustrated embodiment, each recessed region 236, 238, 242, 244, respectively, includes two opposing end walls that provide an interference to prevent most lateral movement of the associated float 214, 216 when the float is secured to the cage 201 by the fasteners 218, 220, 222, 224. FIG. 9 illustrates that the second recessed region 238 includes a depth d between a nominal elevation of the second surface 234 of the float and the elevation of the recessed region 238 of the second surface 234. The depth d is established such that the corresponding fastener 220 is received within the second recessed region 238 such that interference between the end walls of the recessed region and the wire mesh fastener prevents lateral movement of the float. Thus, in various embodiments, the depth d of the recessed region is greater than the outside diameter D of the wire mesh material of the fasteners. According to some embodiments, the depth d of the recessed region is more than 50% greater than the outside diameter D of the wire mesh material of the fasteners. According to one embodiment, the depth d is 0.35" and the D of the wire mesh material is 0.20".

Figure 6:
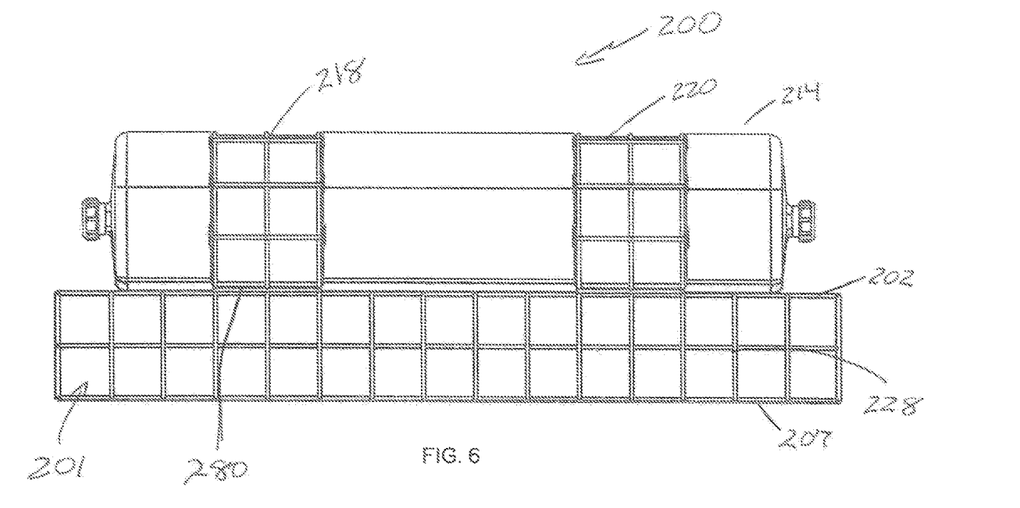
FIG. 6 illustrates a side view of the aquaculture system of FIG. 2.

Referring now to FIG. 6, a side plan view of the aquaculture system 200 is illustrated. Included in this view are the cage 201, the float 214, the first fastener 218 and the second fastener 220. The first longitudinal edge 202, the third longitudinal edge 207 and the first side panel 228 are also illustrated in FIG. 6. According to the illustrated embodiment, the proximate end 280 of the first fastener 218 is directly attached to first longitudinal edge 202. According to this embodiment, the proximate end 280 is hingedly attached to the first longitudinal edge 202 to allow the first fastener 218 to be opened and closed by pivoting the first fastener 218 about the attachment to the first longitudinal edge 202. Depending on the embodiment, the attachment between the fasteners 218, 220, 222, 224 and the cage 201 can be completed using mechanical fasteners such as metal clips, electrical wire ties or other fasteners that permit the fastener 218, 220, 222, 224 to be securely attached while permitting the fastener to pivot about the point(s) of attachment.

According to one embodiment, each fastener 218, 220, 222, 224 is attached to the edge of the cage using a piece of hinge rope, respectively. The hinge rope is wrapped around both the proximate end of the fastener and a wire included in the cage 201. The ends of the hinge rope are secured together by a stainless steel clip. According to a further embodiment, multiple pieces of hinge rope are used to secure each one of the fasteners 218, 220, 222, 224 to the cage. For example, in one embodiment, two pieces of hinge rope are employed to secure each of the first fastener 218 and the second fastener 220, respectively, to the first longitudinal edge 202. According to this embodiment, the hinge rope is tight enough to secure the fasteners 218, 220 at their location along first longitudinal edge 202 but loose enough to allow the fasteners 218, 220 to pivot about the point of attachment when the distal end of the fastener is not attached to the cage 201. In this embodiment, the fasteners 222, 224 are attached to the second longitudinal edge 203 using the same approach.

Figure 7:
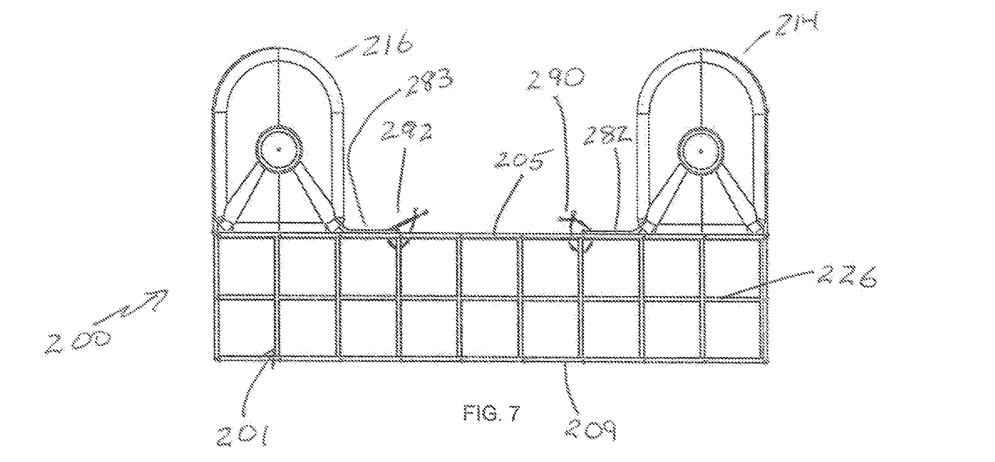
FIG. 7 illustrates an end view of the aquaculture system of FIG. 2.

Referring now to FIG. 7, an end plan view of the aquaculture system 200 is illustrated including a first latch 290 and a second latch 292. Included in this view are the cage 201, first float 214 and the second float 216. A distal end 283 of the third fastener 222 is also illustrated along with the second transverse edge 205, the third transverse edge 209 and the first end panel 226. According to the illustrated embodiment, the distal end 282 of the first fastener 218 is attached to top panel 206 with the first latch 290. According to some embodiments, the latch is operated by hand to tightly secure the distal end 282 of the first fastener 218 to the top panel 206 without the use of tools. Various styles and types of latches can be employed depending on the embodiment provided that the latch is operable by hand without the use of tools, is durable when used in salt water and has sufficient strength to securely connect the distal end 282 of the first fastener 218 to the cage 201. According to some embodiments, the latch 290 includes a shock cord or heavy duty twist tie. According to other embodiments, a mechanical latch includes a first component secured to the distal end 282 of the first fastener 218 and a second component secured to the top panel 206. According to this embodiment, the two components are designed to secure to one another when they brought adjacent to one another when the first fastener 218 is closed.

In various embodiments, each of the fasteners 218, 220, 222, 224 is secured to the top panel 206 in the manner illustrated in FIG. 7 with respect to the first fastener 218. For example, the distal end 283 of the third fastener 222 is secured to the top panel 206 using the latch 292 as illustrated in FIG. 7.

According to another embodiment, the latches 290, 292 are manufactured in the shape of a hook. For example, the latches 290, 292 can be manufactured using a marine grade wire mesh that includes a u-shaped hook at its distal end. In this embodiment, a proximate end of the latch is secured to the cage 201 using shock cord. When open, this form of latch includes the proximate end attached to the cage, a distal end that is not yet secured to the cage and the shock cord in a relaxed state. To secure the fastener in the closed position, the user pulls the latch to extend the shock cord and then hooks the distal end around both the cage and the distal end 282 of the fastener. The shock cord pulls tight when released by the user to tightly attach the distal end 282 to the cage 201 using the latch. According to another embodiment, a plastic latch is employed including a u-shaped hook as described above. According to a further embodiment, the latch is three inches wide.

According to alternate embodiments, the distal end of the fastener is secured using a combination rope and clip similar to the hinge rope described herein. Zip ties can also be used, alone, or for added security, in combination with the latches 290, 292.

To deploy the aquaculture system 200, the fasteners 218, 220, 222, 224 are opened and the floats 214, 216 are placed on the top surface 206 of the cage 201 as illustrated in FIG. 4. The fasteners 218, 220, 222, 224 are pivoted to the closed position, see FIG. 2. In one embodiment, the distal end 282, 283 of each fastener is attached to the top surface 206 by operating the latch 290, 292 without the need for any tools. The preceding secures the fastener 218, 220, 222, 224 in the closed position. As a result, the floats 214, 216 are secured to the cage 201. The cage is loaded with oysters and deployed in the ocean in the orientation illustrated in FIG. 2. Periodically, the cage 201 is flipped over for a temporary period and oriented as illustrated in FIG. 3. This allows the cage 201 and contents to be cleaned with exposure to the environment above the surface of the ocean. The cage 201 is flipped again to place the cage 201 and contents back into the ocean while the floats 214, 216 suspend the aquaculture system 200 at the ocean's surface. In this orientation, the oysters continue to feed and develop over time.

In the event that there is need to sink the cage 201 to the ocean floor, the grower can leave the floats 214, 216 attached to the cage 201, remove the cap 248, 252 and fill the floats 214, 216 with ocean water. Alternatively, the embodiments described herein also allow the grower to quickly and easily release the latch 290, 292, open the fasteners 218, 220, 222, 224 and detach the floats 214, 216 without the use of tools. The floats 214, 216 are easily reattached to the cage 201 without the use of tools when the cages are raised back to the surface. Typically, the cage 201 is raised with a hydraulic hauler, or manually with a boom and pulley. In either case, the amount of weight that must be raised to the surface is substantially reduced if the floats are released instead of being sunk with the cage.

Figure 11:
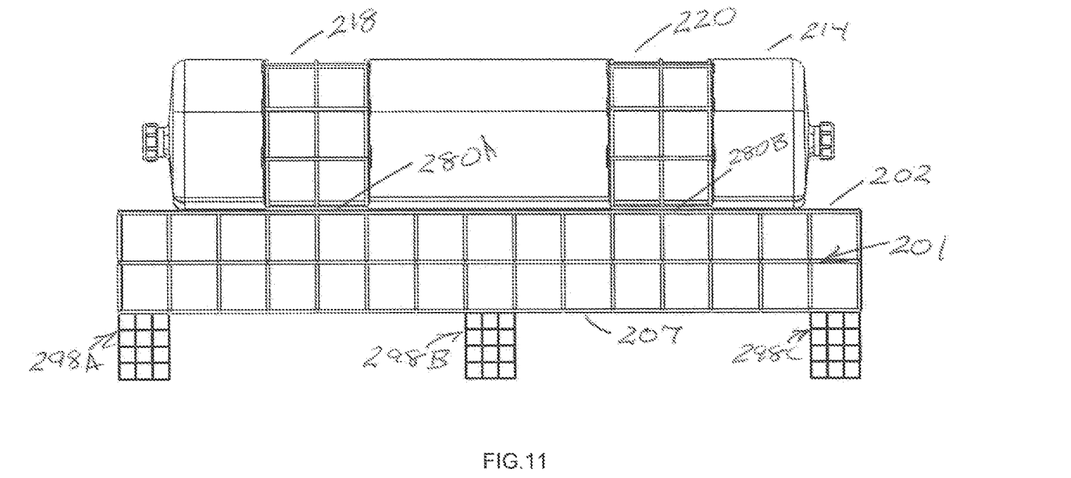
FIG. 11 illustrates a side view of an aquaculture system in accordance with another embodiment.
Figure 12:
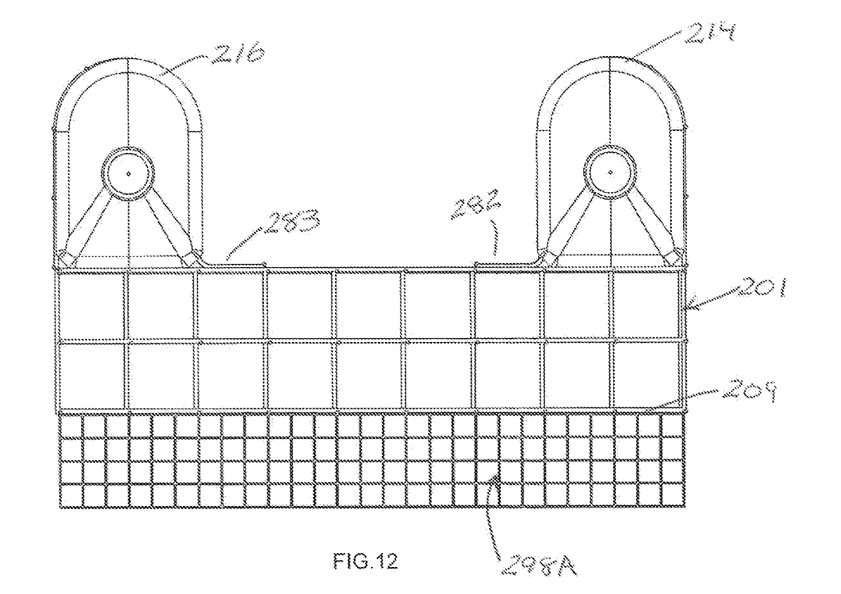
FIG. 12 illustrates an end view of the aquaculture system of FIG. 11 in accordance with one embodiment.

Referring now to FIGS. 11 and 12, an aquaculture system 300 is illustrated in accordance with another embodiment. In the illustrated embodiment, the aquaculture system 300 includes a plurality of feet 298A, 298B, 298C secured to the bottom panel 211 (see FIG. 3) of the cage 201. In various embodiments, the plurality of feet 298A, 298B, 298C can maintain separation between the bottom panel 211 of the cage 201 and the seabed when the cage 201 is located on the ocean floor. For example, the plurality of feet 298A, 298B, 298C contact the ocean floor to keep the cage 201 raised above the seabed to prevent the suffocation of oysters located in the cage 201.

FIG. 11 illustrates a side plan view of the aquaculture system 300. Included in this view are the cage 201, the first float 214, the first fastener 218 and the second fastener 220. The first longitudinal edge 202 and the third longitudinal edge 207 are also illustrated in FIG. 11. FIG. 12 illustrates an end plan view of the aquaculture system 300. Included in this view are the cage 201, the first float 214 and the second float 216. The distal end 282 of the first fastener 218 and the distal end 283 of the third fastener 222 are also illustrated along with the second transverse edge 205, the third transverse edge 209 and the first end panel 226. A narrow end of each of the plurality of feet 298A, 298B, 298C, respectively, is shown in FIG. 11. A longitudinal side of each of the plurality of feet 298A, 298B, 298C, respectively, is shown in FIG. 12.

According to the illustrated embodiment, each of the plurality of feet 298A, 298B, 298C includes walls constructed of wire mesh to form a structure that has an overall longitudinal shape, for example, an overall shape of a beam. In one embodiment, each of the plurality of feet 298A, 298B, 298C includes six panels: a top panel, a bottom panel, a first longitudinal side panel, a second longitudinal side panel, a first end panel and a second end panel. According to this embodiment, the panels are oriented at right angles relative one another to provide a hollow interior with an overall rectangular shape. In these embodiments, the top panel of each of the respective feet 298A, 298B, 298C is secured to and engages the bottom panel 211 of the cage 201. According to this embodiment, the bottom panel of each of the plurality of feet 298A, 298B, 298C, respectively, rests on the seabed when the cage is located on the ocean floor, for example, during winter months.

In the illustrated embodiment, each of the plurality of feet 298A, 298B, 298C extend from the third longitudinal edge 207 to the fourth longitudinal edge 208 to span the width of the cage 201 as illustrated in FIG. 12. In other embodiments, the plurality of feet 298A, 298B, 298C extend only a portion of the width of the cage 201. In these embodiments, the length of the plurality of feet 298A, 298B, 298C is still sufficient to support the cage in an upright position when the cage 201 is resting on the seabed. In various embodiments, the quantity of feet can also vary provided that the quantity is sufficient to keep the cage 201 upright when resting on the seabed while also supporting the weight of the cage 201 including contents. For example, two or more feet can be employed in various embodiments.

Further, the construction of the plurality of feet 298A, 298B, 298C can vary depending on the embodiment. In some embodiments, a single sheet of wire mesh is cut and folded as needed to form a single one of the plurality of feet 298A, 298B, 298C. According to another embodiment, separate panels are welded together to form each of the plurality of feet 298A, 298B, 298C, respectively. In yet another embodiment, separate panels are attached together with fasteners to form each of the plurality of feet 298A, 298B, 298C, respectively. According to one embodiment, end panels are not employed in the plurality of feet 298A, 298B, 298C. According to another embodiment, a top panel is not included in the plurality of feet 298A, 298B, 298C.

The plurality of feet 298A, 298B, 298C can be secured to the bottom panel 211 of the cage 201 using any of a variety of fastening hardware depending on the embodiment. According to one embodiment, compressible metal clips are used to attach each of the plurality of feet, respectively, to the bottom panel 211 of the cage 201.

According to some embodiments, each of the plurality of feet 298A, 298B, 298C are constructed of corrosion resistant wire mesh. According to some embodiments, the plurality of feet 298A, 298B, 298C are constructed of marine grade wire mesh. In one embodiment, the corrosion resistant material is manufactured with a steel wire core that is welded into a grid and then hot dipped galvanized. In a further embodiment, the grid is galvanized by dipping the grid in zinc such that the wire including the welded connections is coated. An adhesive is applied to the hot dipped galvanized steel wire core and a vinyl coating is applied to the grid to which it is bonded by the adhesive. According to an alternate embodiment, the vinyl coating is bonded to the hot dipped galvanized steel wire core by a process that does not use an adhesive. In one embodiment, the wire is an 8 gauge wire. According to one embodiment, the grid is formed using wires separated by substantially 4.5 inches from adjacent wires. According to another embodiment, a smaller gauge wire is used and the grid is sized in any of ½ inch, ¾ inch, 1 inch or 1.5 inch dimensions. In various embodiments, the grid is sized so as to be smaller than the size of the grid employed to construct the cage 201.

Feet 298A, 298B, 298C constructed of mesh provide a lightweight material-of-construction that provides reduced resistance when placed in the ocean relative to a solid-walled object. In addition, the mesh-construction also does not add buoyancy that might otherwise prevent the cage 201 from being sunk to the ocean floor.

According to the illustrated embodiment, the proximate end 280A, 280B of each of the first fastener 218 and the second fastener 220, respectively, are directly attached to first longitudinal edge 202, as described with reference to the aquaculture system 200. The preceding allows the respective fastener 218, 220 to be opened and closed by pivoting the fasteners 218, 220 about the attachment to the first longitudinal edge 202. Further, the manner of securing the fasteners 218, 220 via the various embodiments described with reference to the preceding figures are also available in accordance with the system 300. The types of latches (not shown) employed in the aquaculture system 300 to secure the hinges are also as shown and described with reference to the preceding figures concerning the aquaculture system 200. Various styles and types of latches can be employed depending on the embodiment provided that the latch is operable by hand without the use of tools, is durable when used in salt water and has sufficient strength to securely connect the distal ends 282, 283 of the fasteners 218, 220, respectively, to the cage 201.

The aquaculture system 300 is deployed in the same manner as described above concerning the aquaculture system 200. Further the manner in which the cage 201 is sunk to the ocean floor is also as described above concerning the aquaculture system 200.

In some embodiments, apparatus, systems and methods described herein are also suitable for retrofit applications. As one example, floatation can be added to a bottom cage or a smaller oyster growing tray that was previously deployed without floats. According to this embodiment, a grower can attach fasteners 218, 220, 222, 224 to the cage or tray. The fasteners can then be operated as described herein to attach floats 214, 216 to the cage or tray. The preceding provides the cage or tray with buoyancy that allows it to be temporarily exposed to the environment above the surface of the ocean for cleaning. The floats can easily be removed allowing the cage or tray to sink back to the ocean floor. A grower that maintains dozens or hundreds of cages can employ a rotation system in which a relatively small number of floats 214, 216 are rotated among cages to raise each cage to the surface for a temporary period. The floats are easily detached and moved to another cage to complete the same process. Retrofits of prior aquaculture systems 100 are also facilitated with embodiments described herein. For example, the sets of bands 108, 110 can be cut and the floats 104, 106 removed from the cage 102 illustrated in FIG. 1. The fasteners 218, 220, 222, 224 and floats 214, 216 are then added to the cage 102 to complete the retrofit.

The aquaculture systems 200, 300 described herein illustrate embodiments in which a pair of fasteners is employed with each float. However, according to other embodiments, a float can be secured to a cage using a single fastener of the type shown and described herein. According to these embodiments, the width of the fastener is increased or the length of the float is decreased such that a majority of the outer surface of the float is engaged with the central region 284 of a fastener.

While illustrated and described with reference to a hollow float herein, other embodiments are employed with float(s) that have a different construction. For example, the wire mesh fasteners 218, 220, 222, 224 described herein can be employed with a solid float that is made from Styrofoam or some other buoyant material. In one embodiment, an aquaculture system includes a cage, at least one solid float and one or more fasteners hingedly coupled to the cage to allow the fastener(s) to be operated and the float(s) removed from the cage without the use of tools.

While the fasteners 218, 220, 222, 224 are illustrated and described herein with reference to use with a cage constructed of wire mesh, the fasteners may be employed with cages constructed of different material provided that at least one edge of the cage facilitates a hinged attachment of a fastener of the cage. Further, while the illustrated embodiments depict a cage 201 having a rectangular shape, the shape of the cage can differ (for example, the cage need not have the shape of a parallelogram) provided that an edge of the cage facilitates a hinged attachment of a fastener of the cage.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method including multiple toolless approaches to submerse an aquaculture cage that is buoyant in water when attached with a fastener to a hollow float having an outer surface and defining a volume filled with air, the method comprising:
   providing a plurality of fasteners, each of said fasteners including a grid of multi-layer corrosion resistant material configured to attach the hollow float to the aquaculture cage, the grid including at least two rows of cells located parallel to one another;
   pivoting each fastener about a point of attachment to the cage to move each fastener from a closed position to an open position such that in the closed position the at least two rows of cells encase the hollow float thereby attaching the hollow float to the aquaculture cage and in the open position the at least two rows of cells are moved away from the outer surface such that the hollow float is detachable from the aquaculture cage;
   in a first approach, detaching the hollow float from the aquaculture cage by releasing the fastener without using a tool to allow the cage to sink in the water; and
   in a second approach, with the hollow float attached to the aquaculture cage, at least partially filling the float with fluid to fully submerse both the cage and the hollow float beneath a surface of the water.

2. The method of claim 1, wherein the hollow float includes at least one opening having a fluid tight seal, wherein the fluid includes the water, and wherein the method further comprises, in the second approach, releasing the fluid tight seal by hand to at least partially fill the hollow float with the water.

3. The method of claim 2, wherein the fluid tight seal is provided by a cap threaded to the hollow float, and wherein the method further comprises unthreading the cap to allow the hollow float to at least partially fill with water.

4. The method of claim 1, wherein the grid of multi-layer corrosion resistant material is manufactured from material including a steel wire core welded into the respective grid and hot dipped galvanized, an adhesive layer applied to the hot dipped galvanized steel wire core and a vinyl outer coating adhered to the hot dipped galvanized steel wire core by the adhesive layer.

5. The method of claim 4, wherein the fastener is secured to the cage by a resilient latch when in the closed position, and wherein the method further comprises releasing the resilient latch by hand to allow the fastener to be moved from the closed position to the open position.

6. The method of claim 1, further comprising providing the hollow float with a liquid-tight outer wall shaped and configured to provide the outer surface, the outer wall forming a hollow interior, and at least one opening configured to permit fluid to be added to the hollow interior.

7. The method of claim 6, further comprising:
   wherein the plurality of fasteners include a first fastener and a second fastener each configured to releasably attach the hollow float to the aquaculture cage, each of the first fastener and the second fastener including a proximate end, a distal region and a central region located between and connecting the proximate end to the distal region, respectively, and
   wherein the method further comprises:
   hingedly attaching the respective proximate ends to the aquaculture cage; and
   releasably attaching the respective distal regions to the aquaculture cage.

8. The method of claim 7, further comprising shaping the respective central regions to engage the outer surface with the hollow float secured to the cage by the first fastener and the second fastener.

9. The method of claim 1, further comprising:
   configuring the fastener to include a proximate end, a distal region and a central region located between and connecting the proximate end to the distal region;
   hingedly attaching the proximate end to the aquaculture cage; and
   releasably attaching the distal region to the aquaculture cage.

10. The method of claim 9, further comprising forming the central region into an overall arcuate shape.

11. The method of claim 1, wherein the aquaculture cage includes a planar mesh surface and wherein the method further comprises securing the hollow float to the aquaculture cage by attaching a first terminal end of the fastener to the planar mesh surface on a first side of the hollow float and attaching a second terminal end of the fastener to the planar mesh surface on a second side of the hollow float.

12. The method of claim 11, further comprising, in the first approach, detaching the hollow float from the aquaculture cage by releasing one of the first terminal end and the second terminal end of the fastener from attachment to the planar mesh surface without using a tool to allow the cage to sink in the water.

13. The aquaculture system of claim 12, further comprising providing at least one of the first terminal end and the second terminal end with a substantially flat shape configured to engage the planar mesh surface.

14. A method including multiple toolless approaches to submerse an aquaculture cage that is buoyant in water when attached with a fastener to a hollow float having an outer surface and defining a volume filled with air, the method comprising:
  providing a fastener including a grid of multi-layer corrosion resistant material to attach the hollow float to the aquaculture cage, the grid including at least two rows of cells located parallel to one another, the grid defining a parallelogram including a first end and a second end, at least a central region of the parallelogram formed into an arcuate shape;
  pivotally attaching cells located in adjacent rows of the grid to a point of attachment on the aquaculture cage to selectively move the fastener from a closed to an open position such that in the closed position the at least two rows of cells encase the hollow float thereby attaching the hollow float to the aquaculture cage and in the open position the at least two rows of cells are moved away from the outer surface such that the hollow float is detachable from the aquaculture cage;
  in a first approach, detaching the hollow float from the aquaculture cage by releasing the fastener without using a tool to allow the cage to sink in the water; and
  in a second approach, with the hollow float attached to the aquaculture cage, at least partially filling the float with fluid to fully submerse both the cage and the hollow float beneath a surface of the water.

15. The method of claim 14, wherein the outer surface includes a curved outer surface, and wherein the method further comprises forming the arcuate shape to engage the curved outer surface of the float.

16. The method of claim 14, further comprising including at least four cells in the grid.

17. The method of claim 16, further comprising providing the grid of multi-layer corrosion resistant material with a steel wire core welded into the respective grid and hot dipped galvanized, an adhesive layer applied to the hot dipped galvanized steel wire core and a vinyl outer coating adhered to the hot dipped galvanized steel wire core by the adhesive layer.

18. A method including multiple toolless approaches to submerse an aquaculture cage that is buoyant in water when attached with a fastener to a hollow float including an outer surface and defining a volume filled with air, the method comprising:
  providing a fastener including a grid of multi-layer corrosion resistant material to attach the hollow float to the aquaculture cage;
  pivoting the fastener about a point of attachment to the aquaculture cage to move the fastener from a closed position to an open position such that in the closed position the grid encases the hollow float thereby attaching the hollow float to the aquaculture cage and in the open position the grid is moved away from the outer surface such that the hollow float is detachable form the aquaculture cage;
  in a first approach, detaching the hollow float from the aquaculture cage by releasing the fastener without using a tool to allow the cage to sink in the water; and
  in a second approach, with the hollow float attached to the aquaculture cage, at least partially filling the float with fluid to fully submerse both the cage and the hollow float beneath a surface of the water.

\* \* \* \* \*